June 14, 1960 C. K. RAYNSFORD ET AL 2,941,196
ANALOG-TO-DIGITAL CONVERTER
Filed Feb. 24, 1955 3 Sheets-Sheet 1

INVENTORS.
CHARLES K. RAYNSFORD &
LLEWELLYN S. MERRICK
BY
Campbell, Brumbaugh, Free & Graves
their ATTORNEYS.

ANALOG-TO-DIGITAL CONVERTER

Filed Feb. 24, 1955 3 Sheets-Sheet 2

*INVENTORS.*
CHARLES K. RAYNSFORD &
LLEWELLYN S. MERRICK
*BY*
Campbell, Brumbaugh, Free & Graves
Their ATTORNEYS.

INVENTORS.
CHARLES K. RAYNSFORD & LLEWELLYN S. MERRICK
BY
Campbell, Brumbaugh, Free & Graves
Their ATTORNEYS.

2,941,196

ANALOG-TO-DIGITAL CONVERTER

Charles K. Raynsford, Summit, and Llewellyn S. Merrick, West Orange, N.J., assignors to Vitro Corporation of America, Verona, N.J.

Filed Feb. 24, 1955, Ser. No. 490,192

6 Claims. (Cl. 340—347)

This invention relates to the conversion of data from analog to digital form, and has particular reference to improved and simplified analog-to-digital converters for accomplishing this function.

It is often necessary to convert a continuous function represented by a varying voltage to a discontinuous quantity expressed, for example, in discrete numerical form. Thus, in order to process analog data in digital computers, such data must be suitably converted to digital form. It will be apparent that the speed and accuracy of this conversion determines to a great extent the usefulness of such computers.

The present invention provides apparatus for accurately and reliably converting information represented by an analog signal to digital data. In accordance with the invention, the analog signal, in the form of a varying voltage, is sampled at a rate dependent on the conversion accuracy required to generate variable width timing pulses having a duration determined by the amplitude of the analog signal during the sampling period. The variable width pulses may be employed to control the transmission of constant frequency reference pulses to a counting circuit to provide digital indications.

In one embodiment of the invention, the analog signal is compared with a substantially linearly varying voltage, produced by an integrating circuit in response to the variable width pulses, in order to determine the duration of each of such pulses.

In another embodiment of the invention, the analog signal is selectively coupled to the integrating circuit to control the initial potential of the substantially linearly varying signal. A reference potential is compared with the linearly varying signal in order to control the duration of each of the variable width pulses. Suitably applied inverse feedback may also be used in this circuit. Switching means may be provided to selectively operate the analog-to-digital converter in accordance with either of the above embodiments of the invention.

The invention also provides an electronic multiplexing arrangement for converting a plurality of analog signals to corresponding digital data. Inverse feedback suitably employed in the multiplex system serves to equalize the gain of the channels through which the analog signals are sequentially coupled as well as providing other advantageous results.

These and further advantages of the invention will be more readily understood when the following description is read in connection with the accompanying drawings in which.

Figure 1:
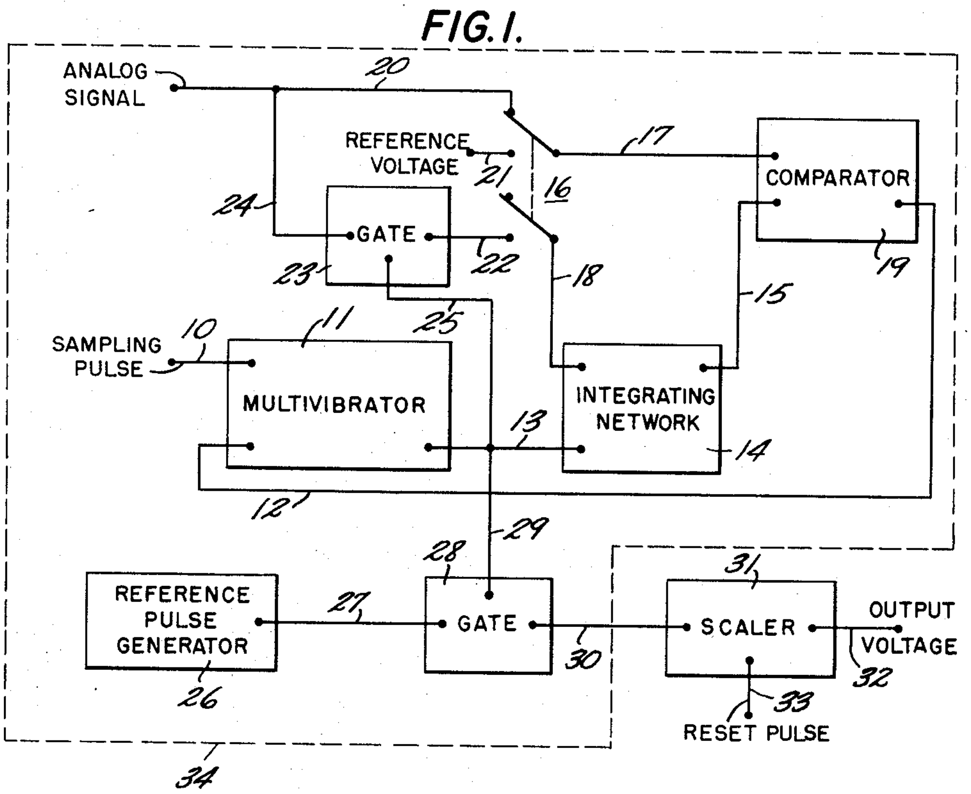
Figure 1 is a schematic circuit diagram in block form of an analog-to-digital converter constructed in accordance with the principles of the present invention.
Figure 2:
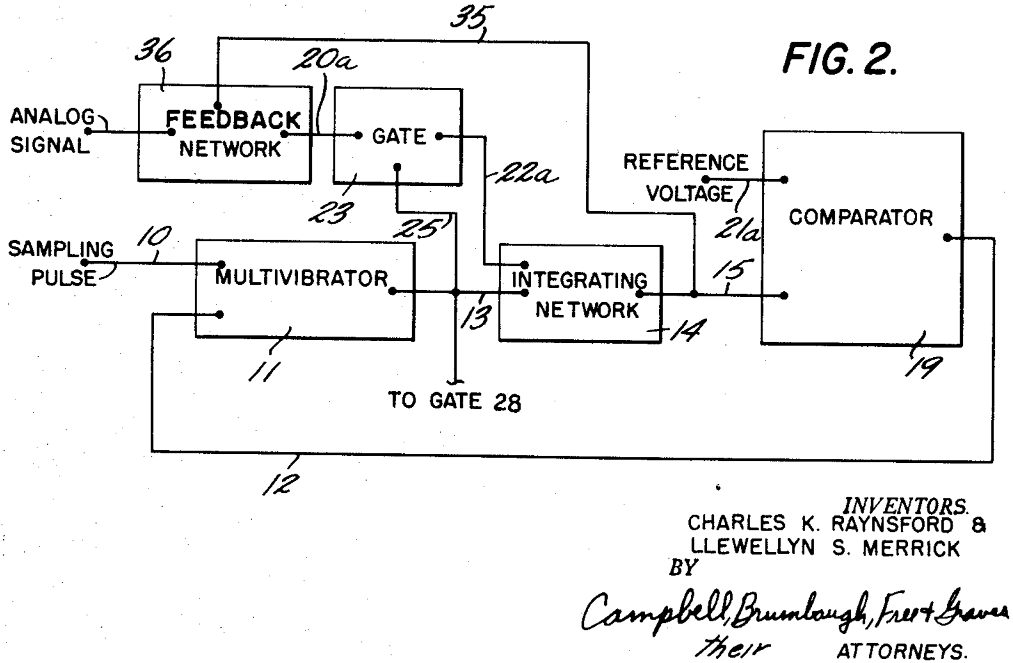
Figure 2 is a schematic diagram in block form of a modified analog-to-digital converter in accordance with the invention.
Figure 3A:
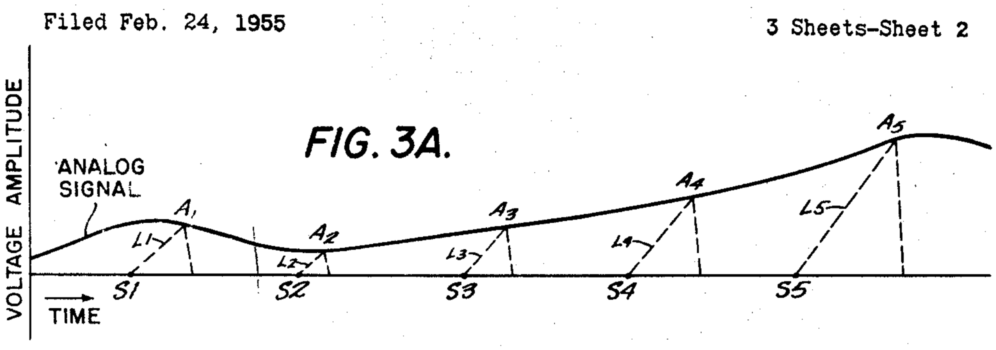
Figure 3B:
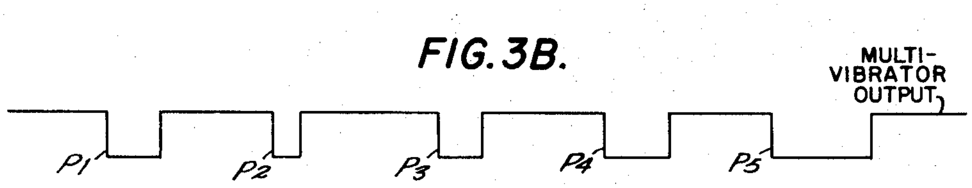
Figure 3C:
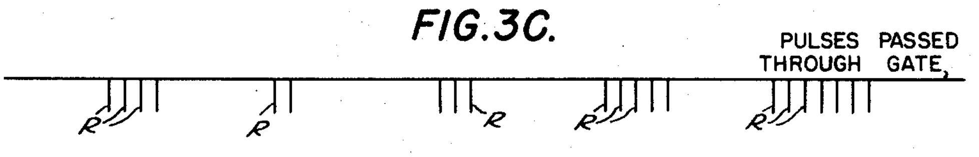
Figure 4A:
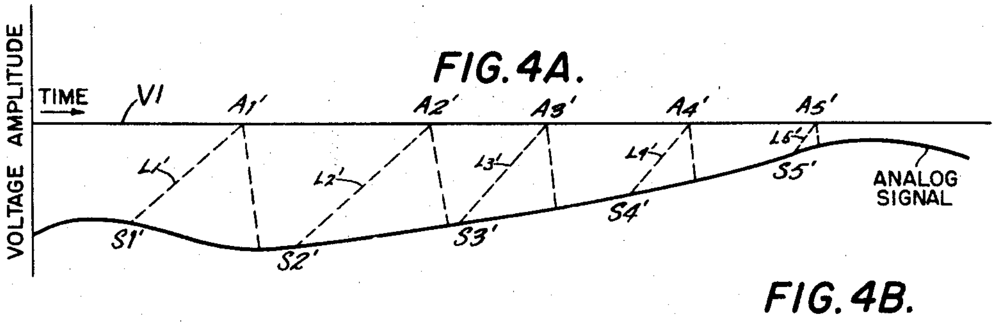
Figure 4B:
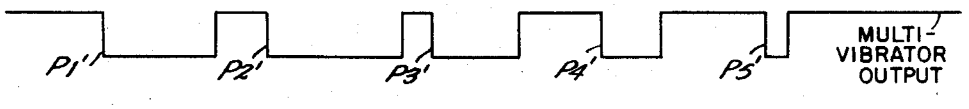
Figure 4C:
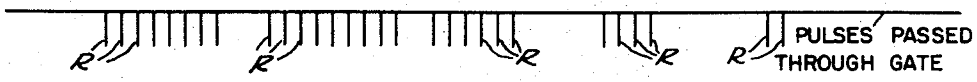
Figure 5:
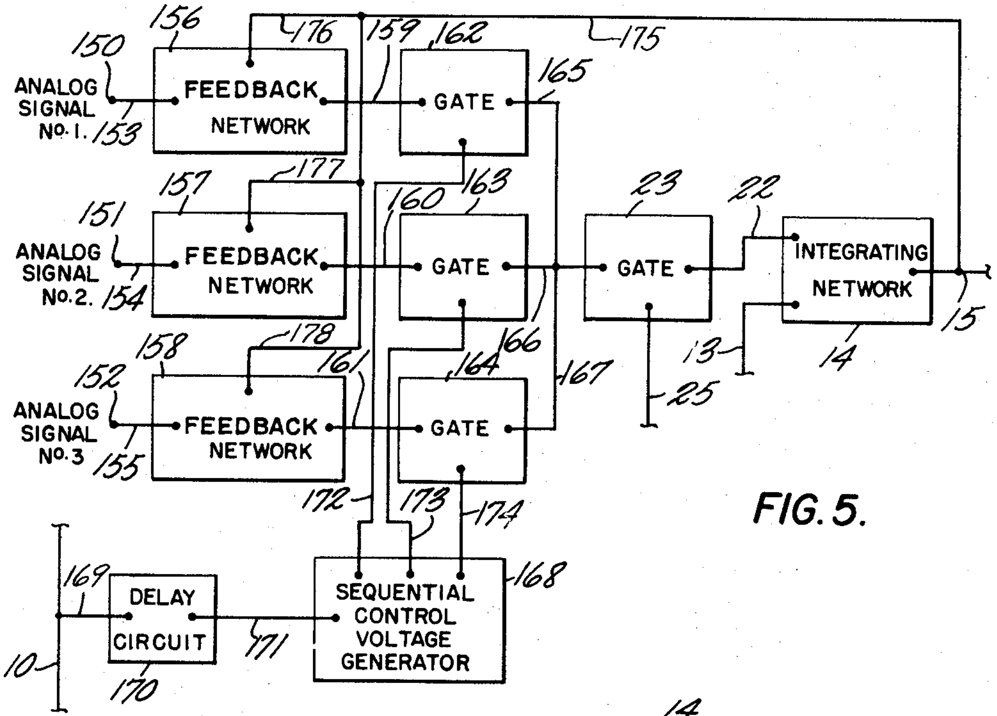
Figure 6:
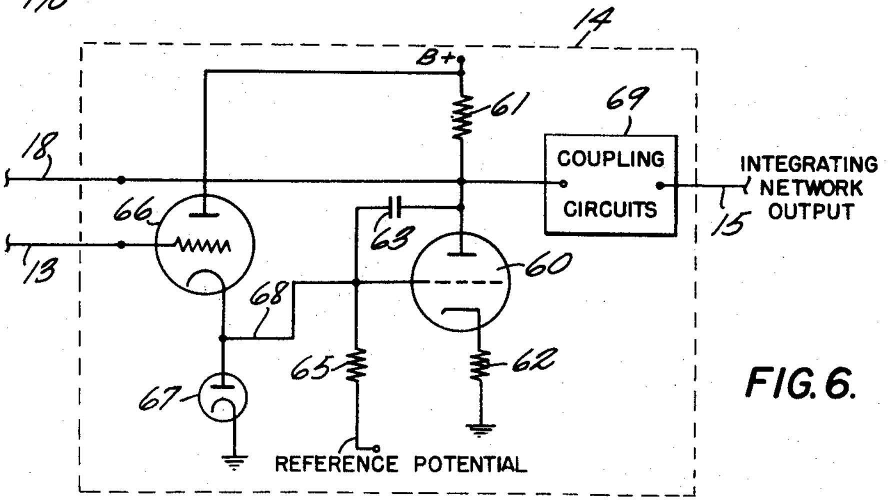
Figure 7:
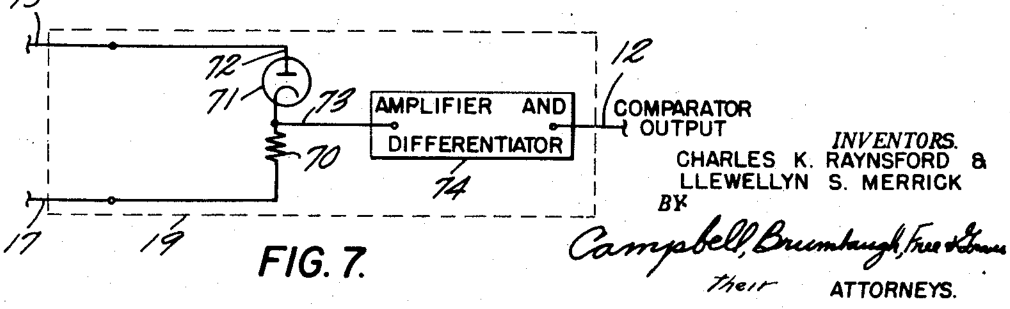

Figures 3*a*, 3*b* and 3*c* illustrate wave forms useful in explaining the operation of the converters shown in Figure 1;

Figures 4*a*, 4*b* and 4*c* illustrate wave forms useful in explaining the operation of the converters shown in Figures 1 and 2;

Figure 5 is a schematic diagram in block form showing the use of the analog-to-digital converter in a multiplex transmission system;

Figure 6 is a schematic circuit diagram of one form of integrating network that may be employed in the block diagrams of Figures 1 and 2; and Figure 7 is a schematic diagram of one form of comparator that may be used in the block diagrams of Figures 1 and 2.

Referring to an illustrative embodiment of the invention in detail with particular reference to Figure 1, a cable 10 is adapted to receive sampling pulses which are supplied to a circuit having two stable states such as a bistable multivibrator 11. A further cable 12 also supplies signals to the multivibrator 11 while a cable 13 leads therefrom to an integrating network 14.

The multivibrator 11 functions to produce variable width timing pulses in response to signals on the cables 10 and 12. Thus, a sampling pulse on the cable 10 turns the multivibrator 11 "on" resulting in the production of a pulse on the cable 13. Subsequently, a signal received on the cable 12 turns the multivibrator 11 "off" to terminate the timing pulse. This action effectively furnishes a pulse of a desired duration to the integrating network 14 for a purpose more fully explained hereinafter. It will be understood that other circuits generating pulses in response to sequentially applied signals may be substituted for the multivibrator 11, such as a conventional relay, for example.

The integrating network 14 comprises circuitry capable of generating a substantially linearly varying signal during the intervals pulses are applied thereto from the multivibrator 11. Thus, if it is assumed that the multivibrator generates a negative timing pulse, the integrating network derives from such an input voltage a positive output voltage whose magnitude increases linearly with time and has the shape of a sawtooth. Many well known circuits will perform this function, one such circuit being shown in Figure 6 together with associated control circuitry forming the network 14. This is essentially a Miller type sweep generator. The plate-cathode circuit of a triode 60 includes a load resistor 61 and a cathode resistor 62, this circuit being connected between ground and a point of positive potential in a conventional manner. A feedback capacitor 63 joins the plate and grid of the triode 60. The grid of the tube 60 is coupled by a resistance 65 to a reference potential preferably somewhat above ground potential. A triode 66 and a diode 67 are series connected between B+ and ground, their common point being joined by a conductor 68 to the grid of the tube 60. Preferably the plate of the triode 60 is joined to an output cable 15 through coupling circuits 69 which may comprise, for example, an amplifier and cathode follower.

Normally, the triode 66 is suitably biased so that current flows through it and the diode 67 to ground. Therefore, at this time the grid of the tube 60 is held at substantially ground potential, the diode 67 preventing it from rising above ground potential and the tube 66 preventing it from going below ground potential. Accordingly, the grid of the tube 60 has a low resistive impedance to ground. Due to this arrangement, large charging currents may flow through the condenser 63 so that the plate of the tube 60 is free to follow the potential impressed thereon by signals on a conductor 18.

When the tube 66 is cut off by a negative pulse from the multivibrator 11 impressed by the conductor 13 on its grid, the grid of the tube 60 goes negative so that it is coupled to ground solely through a high impedance, the resistor 65. Due to the feedback arrangement, the current flow through the capacitor 63 is equal to that flowing through the resistor 65 and these currents flow in the same direction. Moreover, in order to maintain a constant current flow through the capacitor 63, the voltage across it must vary linearly with time. For example, with a given positive reference potential resulting in a constant current flow through the resistor 65, the same current will flow through the capacitor 63 in the same direction. In order to maintain the current flow through the capacitor 63 at the desired constant value, the voltage thereacross must increase linearly at a constant rate. Subsequently, when the timing pulse from the multivibrator 11 is terminated, the current flow through the capacitor 63 will no longer be equal to the current flow through the resistor 65 and the effect of this is to decrease the voltage across the capacitor 63. Consequently, the voltage across the capacitor 63 (which is also the output voltage of the network) has the desired sawtooth wave form. The negative going wave form generated in this circuit may be inverted by the coupling circuits 69.

Returning to Figure 1, a double-pole double-throw switch 16 has its arms connected to cables 17 and 18 leading to a comparator circuit 19 and a further input to the integrating network 14, respectively. The arms of the switch 16 selectively engage a terminal leading to a conductor 20 carrying the analog signal and a blank terminal, or a terminal joined to a conductor 21 held at a reference voltage and a terminal joined to a further conductor 22 coupled through a gate 23 to a cable 24 carrying the analog signal. The gate 23 is controlled by the output of the multivibrator which is joined thereto through a cable 25.

The substantially linearly varying signals from the integrating network 14 are supplied through the cable 15 to an input of the comparator 19 and this results in signals being applied from the comparator 19 through the cable 12 to the multivibrator 11 under certain conditions, as will be explained in detail below.

The comparator 19 comprises an amplitude comparison circuit functioning to compare the instantaneous amplitudes of two signals and furnishing an output signal to the cable 12 when the amplitude of the signal on the cable 15 bears a predetermined relation to the amplitude of the signal on the cable 17. A simple circuit that performs in this manner when the two signals are substantially equal is shown in Figure 7.

Examining the comparator 19 in detail with particular reference to Figure 7, the cable 17, which carries what may be termed the reference signal or voltage, leads through a resistance 70 to the cathode of a diode 71. A conductor 72 joins the anode of the diode 71 to the cable 15 which carries the linearly varying signal to be compared to the reference signal. Also joined to the cathode of the diode 71 by a conductor 73 are amplifier and differentiator circuits 74 having their output joined to the cable 12.

The operation of the circuit shown in Figure 7 is self-evident. Thus, when the voltage supplied to the plate of the diode 71 exceeds the reference voltage on the cathode, it will conduct and the resulting voltage across the resistor 70 will be amplified and differentiated by the circuits 74, the resulting pulse being inoperative through the cable 12 to trigger the multivibrator 11 to its "off" condition. It should be understood that other circuits may be employed to compare the signals such, for example, as a monostable multivibrator biased to be triggered when the linearly varying voltage overcomes the biasing effect of the potential on the cable 17.

Returning to Figure 1, a reference pulse generator 26 furnishes pulses at a constant frequency to a cable 27, these pulses being transmitted through a gate 28, controlled through a cable 29 by the variable width timing pulses generated by the multivibrator 11, to a cable 30 joined to a scaler 31. A cable 32 leading from the scaler 31 carries an output voltage determined by the number of pulses received thereby. A cable 33 also leads to an input of the scaler 31 to effect resetting of this circuit by resetting pulses furnished thereto. Such resetting pulses are controlled to occur a short interval prior to each sampling pulse. It should be understood that the scaler 31 may comprise any conventional counters operating on the scaler principle which generate an output voltage or provide some other indication of the number of pulses applied thereto.

The various circuits 34 employed to generate reference pulses on the cable 30 indicative of the amplitude of the analog signal are enclosed in Figure 1 by a broken line and termed an analog to pulse count converter.

In examining a typical operation of the embodiment of the invention illustrated in Figure 1 with the switch 16 in its upper position, references will be made to the wave forms illustrated in Figures 3*a*, 3*b* and 3*c*. Assuming the application of a sampling pulse to the multivibrator 11 through the cable 10 at a time S1, the multivibrator 11 will be turned "on" to initiate the generation of a pulse P1 which functions to open the gate 28 through the cable 29, this action permitting the application of reference pulses R to the scaler 31. Simultaneously, the integrating network 14 generates a linearly varying signal L1, shown by broken lines, which is applied to the comparator 19 and compared to the analog signal on the cable 17.

As soon as the signal L1 from the integrating network 14 bears a predetermined relation to the instantaneous amplitude of the analog signal, in this instance substantial equality at the point A1 in Figure 3*a*, signal will be furnished through the cable 12 to turn "off" the multivibrator 11 and close the gate 28.

As clearly indicated in Figure 3*c*, the number of reference pulses R transmitted to the scaler 31 through the gate 28 depends upon the width of the pulse P1 generated by the multivibrator 11. Of course, the greater the amplitude of the analog signal, the greater the time required for the signal L1 to attain the amplitude of the analog signal. It is therefore apparent that the multivibrator pulse P1 is directly proportional to the amplitude of the analog signal. Further sampling pulses furnished to the multivibrator 11 at times S2, S3, S4 and S5, as shown in Figure 3*a*, produce pulses P2, P3, P4 and P5 and their control over the reference pulses R is clearly illustrated by the wave forms in Figures 3*b* and 3*c*.

If the switch 16 is now thrown to its alternate position so that its arms engage the terminals connected to the cables 21 and 22, the converter functions in a manner dissimilar in certain respects to the above operation. In this instance, a reference voltage is furnished through the cable 21, the switch 16 and the cable 17 to the comparator 19. The analog signal is furnished through the cable 24, the gate 23, the cable 22, the switch 16 and the cable 18 to the integrating network 14. Referring to Figure 6, it will be noted that the cable 18 leads to the plate of the tube 60. This arrangement permits the analog signal to determine the potential of this point when the gate 23 is open. Since the production of a pulse by the multivibrator 11 in response to a sampling pulse closes the gate 23, the linearly varying pulse generated in response to the multivibrator pulse will vary from a reference level determined by the amplitude of the analog signal.

Referring to Figures 4*a*, 4*b* and 4*c*, the reference voltage supplied to the cable 21 is indicated by V1 and the analog signal varies at a somewhat lower potential. Since the analog signal controls the initial potential of the linearly varying signals generated by the integrating network 14, upon the occurrence of a sampling pulse at a time S1′, a pulse P1′ will be generated by the multivibrator 11 to open the gate 28 and close the gate 23. In addition, a signal L1′ will be produced by the integrating network 14 and supplied to the comparator 19 through the cable 15. The signal L1′ increases linearly until it reaches the reference potential V1 and at this time, the comparator 19 will furnish a signal on the cable 12 to turn "off" the multivibrator 11. This, of course, closes the gate 28 and opens the gate 23.

It will be apparent that the amplitude of the analog signal determines the duration of the pulse P1′ and this, in turn, determines the number of reference pulses R applied to the scaler 31. However, in contrast to the operation of the circuit when the switch 16 is in its upper position, the number of pulses supplied to the scaler 31 is inversely proportional to the amplitude of the analog signal.

While in the particular embodiment of the invention described herein the comparator 19 produces a pulse when the linearly varying signal attains the amplitude of the analog signal or a reference voltage, it will be understood that the comparing function is somewhat broader in concept. Thus, the analog signal or reference signal may set any desired reference level which, when attained by the linearly varying signal, results in the generation of a pulse. Such reference level may be the threshold value at which a monostable multivibrator, for example, may be triggered to generate a pulse.

An examination of the wave forms shown in Figures 3*a*, 3*b* and 3*c* and Figures 4*a*, 4*b* and 4*c* clearly indicates another difference between the two modes of operation of the analog-to-digital converter shown in Figure 1. When the switch 16 is actuated to its upper position, the analog signal is effectively sampled at the time A1 which occurs a relatively long period after the sampling pulse is applied to the multivibrator 11. On the other hand, with the switch 16 in its lower position, the amplitude of the analog signal at the time S1′, which is substantially coincident with the application of the sampling pulse to the conductor 10, determines the width of the pulse P1′. In other words, the scaler 31 indicates the amplitude of the analog signal when the multivibrator 11 is turned "off" in the first mode of operation and indicates the amplitude of the analog signal at the instant the multivibrator is turned "on" in the second mode of operation.

It is advantageous to sample the analog signal at a high rate in order to faithfully reproduce it in digital form. Preferably, the sampling frequency is at least twice as high as the highest frequency of the analog signal. For example, the sampling pulses may occur on the order of 1000 cycles per second for effective sampling of rapidly varying analog information.

The analog-to-digital converter formed when the switch 16 is actuated to its lower position is shown, with some modification, in Figure 2. In this instance, a feedback cable 35 is joined to the cable 15 and leads to a conventional feedback network 36 interposed between the terminal receiving an analog signal and a cable 20*a*. A cable 22*a* joins the gate 23 to the network 14, while a cable 21*a* connects a reference voltage to the comparator 19. The feedback arrangement provides for inverse feedback of the analog signal during switching thereof, the network 36 precluding certain undesirable effects such as phase shift at either end of the frequency band. Any conventional inverse feedback network may be used such, for example, as one of those disclosed in "Vacuum Tube Amplifiers" volume 18 of the Radiation Laboratory series, published by McGraw-Hill Book Company Inc. in 1948. An arrangement used in many negative feedback applications and applicable to this system comprises a triode having its grid receive the analog signal, the feedback signal being applied by a suitable voltage divider to the triode's cathode. Conventional phase shift networks may be included in such feedback networks. The inverse feedback drastically decreases drift, distortion and noise, increases stability and renders the circuit substantially independent of variations in circuit elements such as the tubes.

The present analog-to-digital converter can readily be adapted to multiplex transmission of a plurality of analog signals. Referring to Figure 5, a plurality of analog signals are supplied to terminals 150, 151 and 152 joined by cables 153, 154 and 155, respectively, to feedback networks 156, 157 and 158, respectively. Further cables 159, 160 and 161 couple the feedback networks 156, 157 and 158 to gates 162, 163 and 164, respectively, the outputs thereof being furnished through cables 165, 166 and 167 to the gate 23. A sequential control voltage generator 168, controlled by slightly delayed sampling pulses obtained from the cable 10 through a delay circuit 170, determines through cables 172, 173 and 174 the condition of the gates 162, 163 and 164, respectively. Thus, each time the generator 168 receives a delayed sampling pulse, one of the gates 162, 163 and 164 is closed and another one opened. It will be apparent that such switching could occur after the generator 168 has received one, two or any desired number of delayed sampling pulses. Also, other pulses related, for example, to the trailing edge of the timing pulse may be used to control the generator 168.

The gate 23 is controlled as described in connection with Figure 2, its output being fed through the integrating network 14 to the cable 15. A cable 175 is connected by cables 176, 177 and 178 to the feedback networks 156, 157 and 158, respectively, to provide inverse feedback in this system. This feedback arrangement overcomes difficulties that had previously precluded accurate operation of similar type multichannel systems. Thus, each of the channels coupling the plurality of analog signals to the gate 23 inherently has slightly different characteristics and this makes for poor fidelity in such multiplex systems. Tube aging varies in each channel leading to gain differences and other problems. These are intensified in direct coupled systems such as employed in the present instance. However, by providing inverse feedback as shown, gain variations, distortion, drift and noise are drastically reduced.

With the multiplex system shown in Figure 5, successive output signals on the cable 15 are indicative of the analog signals furnished to the terminals 150, 151 and 152. Obviously, any desired number of analog signals may be multiplexed in the above manner.

It will be understood that the above described embodiments of the invention are illustrative only and modifications thereof will occur to those skilled in the art. Therefore, the invention is not to be limited to the specific apparatus disclosed herein but is to be defined by the appended claims.

We claim:

1. Apparatus for converting information represented by an analog signal to digital information comprising a pulse generator responsive to a sampling signal for initiating generation of a timing pulse, integrating circuit means responsive to said timing pulse for generating a substantially linearly varying signal, gating means for transferring the analog signal to the integrating circuit means to control the initial potential of said linearly varying signal, means for transferring the timing pulse to the gating means to block said analog signal upon initiation of said timing pulse, circuit means for comparing said linearly varying signal and a reference potential to generate a signal representative of the amplitude of said analog signal, said timing pulse generator being responsive to said amplitude representative signal for terminating said timing pulse, whereby the width of the timing pulse is determined by the amplitude of the analog signal, and means controlled by said timing pulse for producing reference pulses indicative of the amplitude of said analog signal.

2. Apparatus as defined in claim 1 in which inverse feedback is provided from the output of the integrating circuit means to the input of the gating means.

3. Apparatus as defined in claim 1 in which a plurality of analog signals are sequentially supplied through a plurality of channels to said gating means, and means forming an inverse feedback path from the output of the integrating circuit means to the channels to affect the analog signals supplied through said channels.

4. In apparatus for converting information represented by an analog signal to digital information, a pulse generator responsive to a sampling signal for initiating generation of a timing pulse, circuit means responsive to said timing pulse for generating a substantially linearly varying signal, gating means for transferring the analog signal to the circuit means to control the initial potential of said linearly varying signal, means for transferring the timing pulse to the gating means to block said analog signal upon initiation of said timing pulse, circuit means for comparing said linearly varying signal and a reference potential to generate a signal representative of the amplitude of said analog signal, said timing pulse generator being responsive to said amplitude representative signal for terminating said timing pulse, whereby the width of the timing pulse is determined by the amplitude of the analog signal.

5. Apparatus as defined in claim 4 in which inverse feedback is provided from the output of the circuit means to the input of the gating means.

6. Apparatus as defined in claim 4 in which a plurality of analog signals are sequentially supplied through a plurality of channels to said gating means, and means forming an inverse feedback path from the output of the circuit means to the channels to affect the analog signals supplied through said channels.

References Cited in the file of this patent

UNITED STATES PATENTS

| | | |
|---|---|---|
| 2,616,965 | Hoeppner | Nov. 4, 1952 |
| 2,733,358 | Carapellotti | Jan. 31, 1956 |
| 2,761,968 | Kuder | Sept. 4, 1956 |
| 2,773,641 | Baum | Dec. 11, 1956 |
| 2,787,418 | MacKnight | Apr. 2, 1957 |
| 2,824,285 | Hunt | Feb. 18, 1958 |

OTHER REFERENCES

Electronic Analog Computers, Korn and Korn, McGraw-Hill Book Co., 1952, pages 288–290.

Slaughter: "An Analog to Digital Converter With an Improved Linear Sweep Generator," Convention Record of the March 23–26 1953, IRE National Convention, part 7, pages 7–12.

MacKnight: "Multichannel Analog Input-Output Conversion System for Digital Computer," part VII, "Convention Record of the March 23–26, 1953, National IRE Convention," April 1953, (page 5 relied on).